June 24, 1941. H. LOEN 2,246,741
LUMINOUS INDICATOR
Filed Dec. 23, 1938
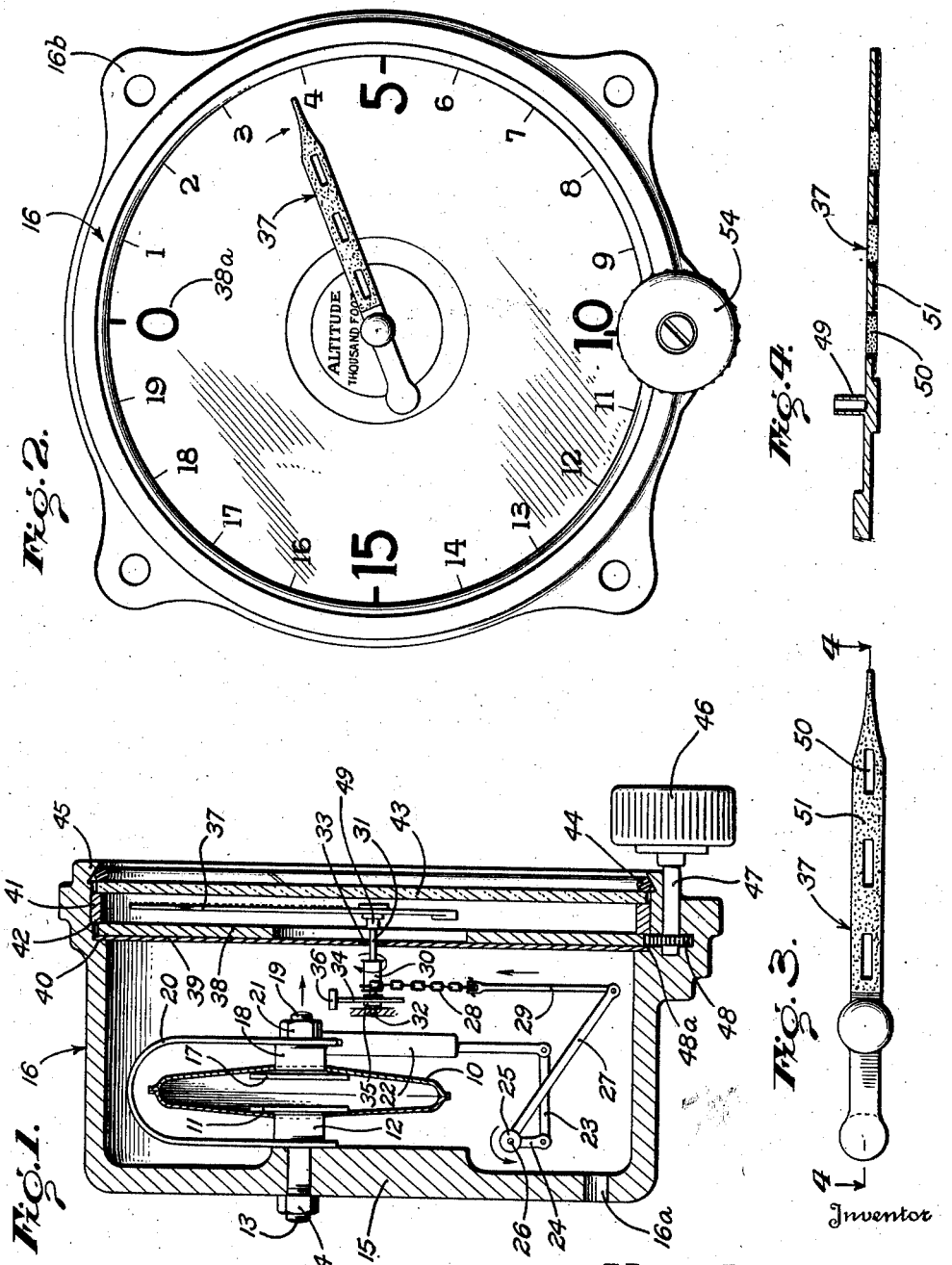
Inventor
Hans Loen.
By Stephen Cerstvik
Attorney Patented June 24, 1941

2,246,741

UNITED STATES PATENT OFFICE 2,246,741

LUMINOUS INDICATOR

Hans Loen, Bloomfield, N. J., assignor to Bendix Aviation Corporation, South Bend, Ind., a corporation of Delaware Application December 23, 1938, Serial No. 247,540

3 Claims. (Cl. 116—129)

The present invention relates to indicating instruments and more particularly to indicating instruments for aircraft and the like.

More specifically the present invention relates to novel indicating means for an indicating instrument whereby a sharper optical impression is presented to the eye of an observer.

Devices of the prior art have utilized an indicating element provided with a light source illuminating said element, or means for painting or treating the indicator or pointer, whereby it was rendered readily visible in the absence or in the presence of illumination. Such prior art devices, however, have presented a blurred optical impression to the eye of an observer and, therefore, easy and precise readings of the instrument could not be obtained. Further, such prior art devices required the application to the indicator of large quantities of such painting or treating material, said material often being quite expensive and thereby increased the cost of production of an instrument. It is, therefore, one of the objects of the present invention to provide a novel indicating means, whereby the foregoing undesirable characteristics are eliminated.

Another object is to provide a novel treated indicating means for an indicating instrument, whereby a small quantity of said treating material is sufficient to provide a sharp optical outline of the indicating means.

Still another object is to provide a novel treated indicating means, whereby the treating material is securely held to the indicating means, the holding means providing a sharp contrasting optical impression of the indicating means with the treating material.

A further object is to provide a novel pointer for an indicating instrument, comprising a slotted member and luminous material applied to said member and entering said slot but only partially closing the same, whereby said material is securely held to the member and sharply contrasting optical impressions are presented to the eye of an observer.

The above and further objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration and description only, and is not designed as a definition of the limits of the invention, reference being primarily had for this purpose to the appended claims.

In the drawing wherein like reference characters refer to like parts throughout the several views;

Fig. 1 is a side elevation, in section, of one form of a complete indicating instrument embodying the invention;

Fig. 2 is a front view of the device of Fig. 1;

Fig. 3 is a detailed view illustrating the novel construction of an indicating element embodying the invention; and Fig. 4 is a sectional view taken on the line 4—4 of Fig. 3.

Referring to the drawing and more particularly to Fig. 1, the instrument embodying the present invention is shown, by way of example, in the form of an altimeter comprising an evacuated and sealed pressure-responsive diaphragm 10 having means extending from one side thereof and comprising a flange 11, boss 12, threaded portion 13 and nut 14, whereby the diaphragm is mounted upon the base 15 of the casing 16 which is provided with an opening 16a for introduction of atmospheric pressure into casing 16. Casing 16 is provided with a plurality of ears 16b whereby said casing may be mounted on an instrument panel.

A flange 17, boss 18 and a threaded member 19 extend from the other side of diaphragm, to which is attached the U-shaped spring 20, extending between the boss 12 and base 15 at one end thereof and fastened to the boss 18 and member 19 by the nut 21 at the other end thereof. Under normal atmospheric pressure, the diaphragm 10 is maintained in a contracted position with tension being applied to the spring 20. As the atmospheric pressure decreases, the pressure on the outside of the diaphragm decreases, whereby the spring 20 is permitted to expand the diaphragm.

Attached to the spring 20 at one end thereof is the long lever 22. An articulated link 23 is connected to the other end of lever 22 at one end thereof and to a link 24 at the other end thereof. Link 24 is connected to the countershaft 25 journaled at 26 whereby movement of the link 24 clockwise or counter-clockwise, rotates the rockshaft in the same direction. A lever 27 is connected to the rockshaft 25 at one end of said lever for rotation with the rockshaft and is connected at the other end to a chain 28 by articulated link 29. The chain 28 is wrapped around a drum 30 and attached thereto at its end.

The drum 30 is mounted for rotation on a shaft 31 journaled at 32 at one end thereof and supported by bearing 33 adjacent the other end thereof. A hair spring 34 is attached at one end thereof to a collar 35 mounted on the shaft 31, the other end of said spring being securely held by suitable means 36. A pointer 37, which is the essence of the present invention and which will be described in detail later, is carried at the end of shaft 31 for rotation over a dial 38 provided with numerals 38a which may be composed of luminous material such as radium paint, said dial being rotatably mounted on a plate 39 fastened to a shoulder 40 of the casing 16. A spacing ring 41 is held in abutting relation with a shoulder 42 in casing 16 by means of a cover glass 43 and a resilient split ring 44 cooperating with a lip 45 of casing 16. A knob 46 mounted on a shaft 47 carrying a pinion 48 meshing with a gear 48a on the dial plate 38 is provided, whereby the dial plate and the numerals thereon may be rotated so that any elevation or barometric pressure may be selected as the zero.

The novel means of the present invention comprise the pointer 37 mounted on shaft 31 by a hollow boss 49 (see Figs. 1 and 4) snugly fitting around shaft 31. The pointer may be constructed of an elongated strip of metal (see Figs. 3 and 4) which is provided with a series of elongated perforations or slots 50 extending completely through said strip, as shown in Fig. 4. The outer surface of said strip is painted with a luminous material such as radium paint 51, the paint entering but only partly closing these openings or slots and adhering to the sides thereof to thereby provide a suitable anchorage of the paint to the metal strip. Since the surface of the pointer 37 is largely composed of the slots 50, the amount of paint required can be considerably reduced even though some of the paint enters the slots for firmer adherence of the paint to the pointer. Due to the provision of the openings or slots 50, there is provided an optical outline which contrasts sharply with the luminous surface, thereby presenting an appearance of a sharp line of luminous material instead of the hazy, slightly nebulous appearance provided when a non-perforated pointer is completely covered with luminous paint. With the sharp optical outline provided by the composite pointer, the exact indication of the instrument may be readily obtained, and the coaction of the slots and the luminous material provides a firm connection between said material and the pointer.

The operation of the device described is as follows:

Atmospheric pressure enters the opening 16a in casing 16 so that atmospheric pressure exists at all times on the outside of the evacuated diaphragm 10. As the altitude increases, the atmospheric pressure decreases and the diaphragm 10 under the action of spring 20 expands, as indicated by the arrow in Fig. 1, to move the long lever 22 to the right as shown in the same figure, whereby link 23 is moved in the same direction to rotate link 24 and rockshaft 25 counter-clockwise, as indicated by the curved arrow in Fig. 1. Counter-clockwise rotation of rockshaft 25 rotates lever 27 likewise to move link 29 as shown by the arrow adjacent the same in Fig. 1, whereby chain 28 is wound upon the drum 30 under the action of hair spring 34 so that drum 30 and shaft 31 are rotated clockwise as seen from the face of the instrument, thereby rotating pointer 37 clockwise over the dial 38.

As the pointer assumes various positions relative to the numerals 38a, the sharp optical outline presented by the pointer due to the luminous slots or perforations provides an easily readable, sharp indication of the respective values of the altitude.

Novel means are thus provided forming an indicating instrument that is easily and precisely readable.

Although only one embodiment of the invention has been illustrated and described, various changes and modifications in form, materials and relative arrangement of parts, which will not appear to those skilled in the art, may be made without departing from the scope of the invention. Reference is, therefore, to be had to the appended claims for a definition of the limits of the invention.

What is claimed is:

1. In an indicating instrument having an operating mechanism, the combination of a dial provided with graduations, and a luminous pointer connected to said mechanism for actuation thereby over said dial adjacent said graduations, said pointer comprising an elongated member having a narrow elongated perforation extending through said member, and luminous material applied to said member and to the sides and ends of said perforation, said perforation providing an optical outline contrasting sharply with the luminous material on said pointer attributing to the pointer an appearance of a sharply defined luminous line adapted to cooperate with said graduations to provide a precise observation of the value indicated by said pointer.

2. A pointer comprising an elongated member, a series of perforations in said member extending entirely through the member from one side to the other and aligned with each other along the length of said pointer, and a covering of luminous material applied to said member and to the sides of said perforations, the latter providing an optical outline contrasting sharply with the luminous material on said pointer attributing to the pointer an appearance of a sharply defined luminous line.

3. A pointer comprising an elongated member having a series of longitudinally aligned slots extending entirely through said member from one side to the other and along the length thereof, and a covering of luminous material applied to a surface of said member and to the sides of said slots, said slots thereby providing an optical outline contrasting sharply with the luminous material on said pointer attributing to the pointer an appearance of a sharply defined luminous line.

HANS LOEN.